United States Patent
Flegel

(10) Patent No.: US 6,414,240 B1
(45) Date of Patent: Jul. 2, 2002

(54) GENERATOR TRANSFER SWITCH HAVING A COMPARTMENT WITH EXPOSED WIRE LEADS FOR INTERCONNECTION WITH A POWER INPUT

(75) Inventor: David D. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 0 days.

(21) Appl. No.: 09/526,237

(22) Filed: Mar. 15, 2000

(51) Int. Cl.$^7$ ............ H02G 3/08; H01H 1/00; H02B 1/04

(52) U.S. Cl. ............ 174/50; 307/125; 361/358

(58) Field of Search ............ 174/50, 66, 51, 174/65 R; 307/64, 125, 43; 361/358, 356, 372, 601

(56) References Cited

U.S. PATENT DOCUMENTS

| | | |
|---|---|---|
| D122,844 S | 10/1940 | Platz |
| 2,577,974 A | 12/1951 | McKinley |
| 2,603,546 A | 7/1952 | Lais |
| 2,784,354 A | 3/1957 | Gaubatz |
| 3,277,251 A | 10/1966 | Daly |
| 3,284,591 A | 11/1966 | Daly |
| 3,315,556 A | 4/1967 | Speck |
| 3,353,068 A | 11/1967 | Turk |
| 3,361,938 A | 1/1968 | Watson |
| 3,391,374 A | 7/1968 | Schleicher |
| 3,523,166 A | 8/1970 | Daly |
| 3,559,148 A | 1/1971 | Hafer |
| 3,618,804 A | * 11/1971 | Krause ............ 220/3.8 |
| 3,631,324 A | 12/1971 | Jones |
| 3,636,237 A | 1/1972 | Hafer |
| 3,654,484 A | 4/1972 | Jorgenson et al. |
| 3,716,683 A | 2/1973 | Hafer |
| 3,723,942 A | 3/1973 | Dennison |
| 3,731,256 A | 5/1973 | Hafer |
| 3,739,321 A | 6/1973 | Murphy et al. |
| 3,742,431 A | 6/1973 | Kobyner |
| 3,746,936 A | 7/1973 | Coffey et al. |
| 3,781,765 A | 12/1973 | Schleicher |
| 3,895,179 A | 7/1975 | Wyatt |
| 3,922,053 A | 11/1975 | Hafer |
| 3,949,277 A | 4/1976 | Yosset |

(List continued on next page.)

OTHER PUBLICATIONS

Gentran Catalog, GT1094C, Reliance Time Controls, Icc., 1820 Layard Avenue, Racine, WI 53404, undated, No Date Available.

*Primary Examiner*—Rajnikant B. Patel
(74) *Attorney, Agent, or Firm*—Boyle, Frederickson, Newholm, Stein & Gratz, S.C.

(57) ABSTRACT

A power transfer switching mechanism for interposition between a remote power inlet box and the electrical load center of a building includes a compartment for receiving power input wires connected to the remote power inlet box, or for receiving a power input receptacle. The switching mechanism includes a cabinet defining an internal cavity within which a series of switches are mounted. One or more lead wires are connected to the switches, and define ends which extend into the compartment. The compartment is accessible through an opening associated with the cabinet of the power transfer switching mechanism, and a cover is selectively positionable over the opening to provide or prevent access to the compartment. With the cover removed, the lead wires can be connected to the power input wires using conventional wire-to-wire connectors, and the wires and connectors can then be placed within the compartment and concealed by mounting the cover to the cabinet of the power transfer switching mechanism. Alternatively, a power input receptacle can be mounted to the cover, and the ends of the lead wires can either be engaged directly with the power input receptacle or with connector wires extending from the power input receptacle.

21 Claims, 6 Drawing Sheets

U.S. PATENT DOCUMENTS

| | | | |
|---|---|---|---|
| 4,067,529 A | 1/1978 | Milcoy |
| 4,088,829 A | 5/1978 | Milcoy |
| 4,390,926 A | 6/1983 | Hart |
| 4,450,503 A | 5/1984 | Warner |
| D276,334 S | 11/1984 | Dickerson |
| 4,782,427 A | 11/1988 | Marks |
| 4,899,217 A | 2/1990 | MacFadyen et al. |
| 5,070,252 A | 12/1991 | Castenschiold et al. |
| 5,070,429 A | 12/1991 | Skirpan |
| 5,233,511 A | 8/1993 | Bilas et al. |
| 5,239,129 A * | 8/1993 | Ehrenfels | 174/51 |
| 5,268,850 A * | 12/1993 | Skoglund | 307/43 |
| 5,301,086 A | 4/1994 | Harris et al. |
| 5,568,362 A | 10/1996 | Hansson |
| 5,638,256 A | 6/1997 | Leach et al. |
| 5,648,646 A | 7/1997 | Flegel |
| 5,726,507 A | 3/1998 | Tipton |
| 5,761,027 A | 6/1998 | Flegel |
| 5,784,249 A | 7/1998 | Pouliot |
| 5,870,276 A | 2/1999 | Leach et al. |
| 5,895,981 A | 4/1999 | Flegel |
| 5,984,719 A | 11/1999 | Flegel |

* cited by examiner

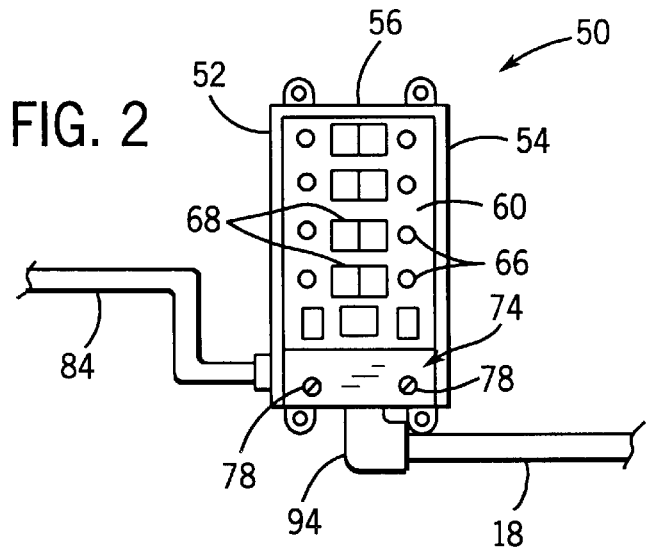
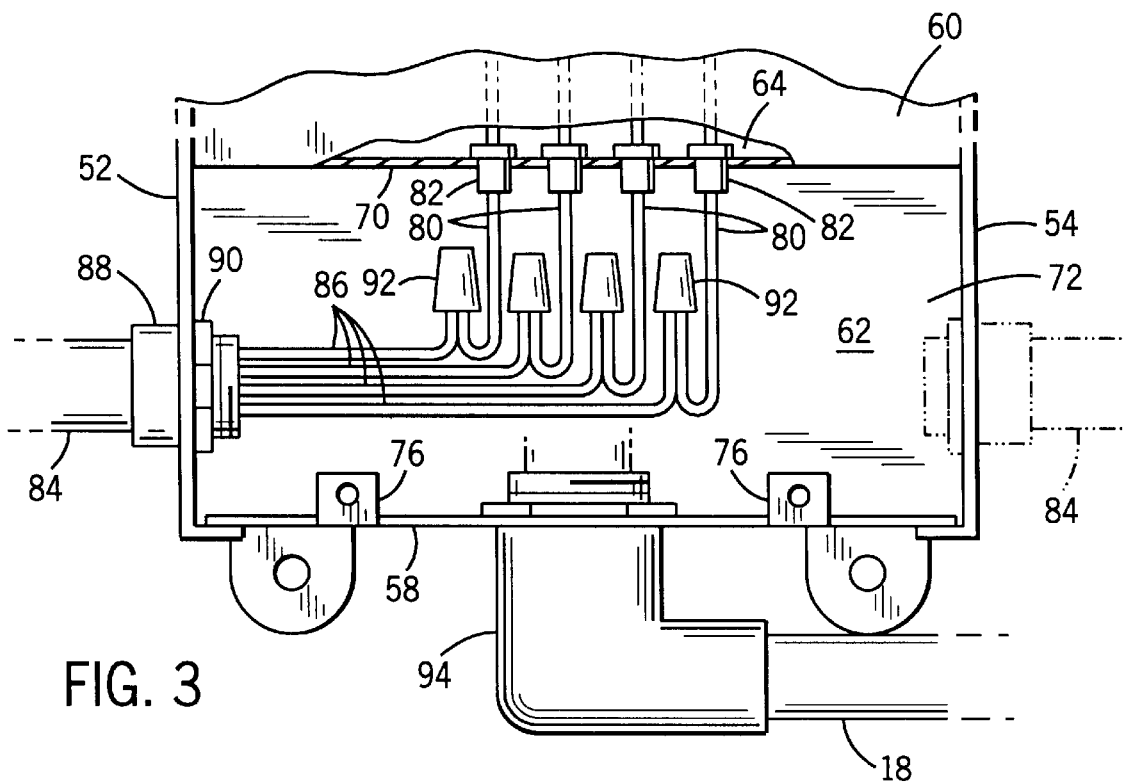

GENERATOR TRANSFER SWITCH HAVING A COMPARTMENT WITH EXPOSED WIRE LEADS FOR INTERCONNECTION WITH A POWER INPUT

BACKGROUND AND SUMMARY OF THE INVENTION

This invention relates to a power supply arrangement for providing auxiliary power to the electrical system of a building, such as from a standby generator or the like.

Portable generators are used in certain situations to supply electrical power to residential and commercial load circuits during a utility power outage. A system for interconnecting the generator with the load center of a building typically includes a power inlet box having a receptacle for receiving a plug extending from the generator.

The power inlet box is typically mounted to the exterior of a building, and is adapted for connection to a transfer switching mechanism which establishes an electrical path between the generator and the load center. The transfer switching mechanism typically includes a series of switches and circuit breakers, which are operable to supply power to certain selected circuits of the load center. The circuits of the transfer switching mechanism are wired to selected circuits of the load center, through wiring housed within a conduit extending between the transfer switching mechanism and the load center.

A typical transfer switching mechanism includes a housing provided with a power input receptacle. The remote power inlet box is wired to a power cord connected to a junction box, and the power cord is engageable with the power input receptacle of the transfer switching mechanism so as to provide power to the transfer switching mechanism from the generator. An alternative arrangement is illustrated in Flegel U.S. Pat. No. 5,895,981 issued Apr. 20, 1999, the disclosure of which is hereby incorporated by reference. In the '981 patent, the transfer switching mechanism includes a terminal compartment within which a set of terminals is located. The terminals are wired to the switches of the transfer switching mechanism. A set of power input wires extend from the power inlet box, and into the terminal compartment of the transfer switching mechanism. The ends of the power input wires are connected to the terminals, to establish a direct, non-plug type connection between the power inlet box and the transfer switching mechanism.

It is an object of the present invention to provide a simplified transfer switching mechanism which establishes a non-plug type connection with a power input adapted for interconnection with an auxiliary power source such as a generator. It is a further object of the invention to provide such a transfer switching mechanism which does not utilize a terminal arrangement for establishing the connection between the power inlet box and the transfer switching mechanism, to thereby eliminate the space and expense involved in a terminal-type connection arrangement. It is a further object of the invention to provide such a transfer switching mechanism which is relatively simple in its components and construction, to thereby reduce the cost of the components of the transfer switching mechanism and the labor involved in assembly of the transfer switching mechanism. A still further object of the invention is to provide such a transfer switching mechanism which provides a simple, convenient and reliable arrangement for interconnecting the transfer switching mechanism with a power input arrangement.

In accordance with the invention, a power transfer device includes a housing and a series of switches mounted to the housing and interconnected with the electrical system of a building. A cavity or compartment is formed within the housing, and is accessible through an access opening defined by the housing. A series of lead wires are interconnected with the switches. The lead wires define ends which extend into and are located within the compartment. The ends of the lead wires are adapted for engagement with a power input interconnected with the auxiliary power source, such that the lead wires establish an electrical path between the power input and the switches.

The power input may be in the form of a series of power input wires which extend from a remote power inlet box, which includes a power input receptacle for receiving a plug-type connector extending from the auxiliary power source, such as a portable generator. In this embodiment, the power input wires are connected to the ends of the lead wires, such as by twist-on connectors. Once the appropriate connections have been made, the wire ends and connectors are placed within the compartment of the power transfer device housing. A cover is mounted to the housing over the access opening, so as to enclose the compartment within which the wire ends and the connectors are located.

In another form, a power input receptacle is mounted to the cover, which is adapted to be positioned over the access opening defined by the housing so as to enclose the compartment. The power input receptacle includes engagement structure for receiving a plug-type connector interconnected with the auxiliary power source. In one version, the ends of the lead wires are connected directly to the power input receptacle, and the cover is engaged with the housing such that the power input receptacle extends into the compartment along with the lead wires. In another form, a set of power input wires may be secured to the power input receptacle and adapted for connection to the ends of the lead wires by appropriate connectors, such as twist-on connectors. The power input receptacle, the lead wires and the power input wires are then received within the compartment when the cover is mounted to the housing over the access opening.

A strain relief arrangement is preferably engaged with the wire leads between the switches and the compartment. The strain relief arrangement is in the form of one or more strain relief members with which the lead wires are engaged. The strain relief members may be mounted to a stationary member located adjacent the compartment. The stationary member may be in the form of a transverse wall defined by the housing adjacent the compartment, and the strain relief members may be secured to a mounting plate adapted for connection to the transverse wall. Alternatively, the strain relief members may be mounted to a bracket member separate from the housing and adapted for engagement with the housing.

The invention further contemplates a method of supplying power from an auxiliary power source to a power transfer device having a series of switches, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 2 is a front elevation view of a power transfer device constructed according to the invention, adapted for connection in an auxiliary power supply arrangement for transferring power from an auxiliary power source to the load center of a building, showing a cover mounted to the housing of the power transfer device;

FIG. 3 is a front elevation view of the lower portion of the power transfer device of FIG. 2, showing the cover removed and engagement of lead wires with power input wires;

DETAILED DESCRIPTION OF THE INVENTION

Figure 1:
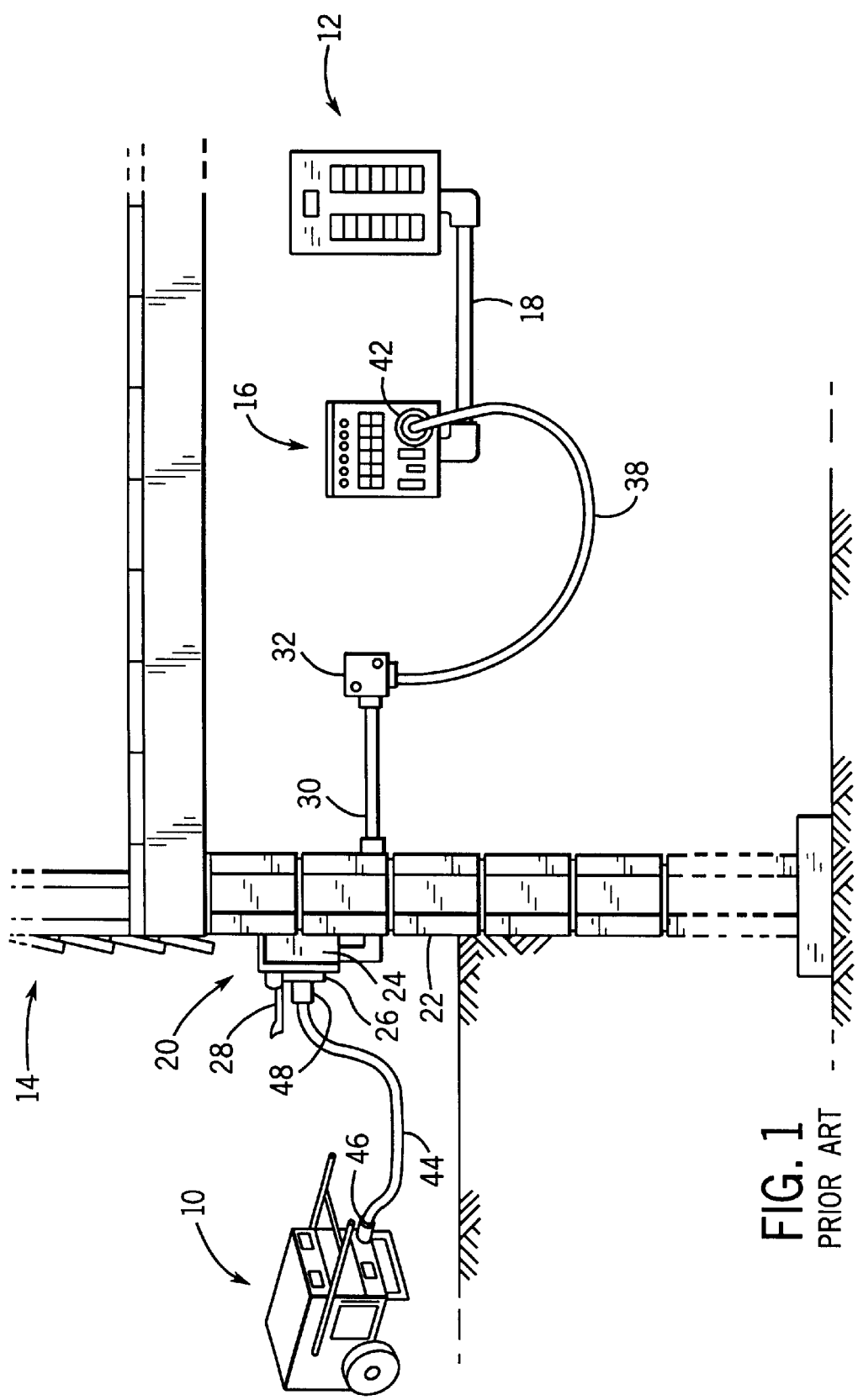
FIG. 1 is a schematic representation showing a prior art power supply arrangement for interconnecting an auxiliary power source, such as a portable generator, with a load center or electrical panel associated with a building.

FIG. 1 shows a prior art power inlet arrangement for interconnecting a portable generator 10 with a main electrical panel or load center 12 located in the interior of a building 14. In the prior art power inlet arrangement of FIG. 1, a manual power transfer panel 16 is mounted adjacent main panel 12, and is interconnected therewith via a series of wires enclosed by a conduit 18 extending between main panel 12 and transfer panel 16. Transfer panel 16 may illustratively be a panel such as that manufactured by Reliance Controls Corporation of Racine, Wis. (e.g. Model 20216 or any other satisfactory model).

A power inlet box 20 is mounted to the wall of building 14, shown at 22. Power inlet box 20 includes an external housing including a series of walls such as 24, and a receptacle 26 mounted to a front wall of the housing. A cover 28 is mounted to the front wall of the housing via a hinge structure, and is movable between an open position as shown in FIG. 1 and a closed position in which cover 28 encloses receptacle 26 when not in use. A conduit 30 extends between inlet box 20 and a junction box 32, and a flexible cord 38 is attached at one end to junction box 32. At its opposite end, flexible cord 38 has a connector 42 engageable with a power inlet receptacle provided on transfer panel 16. Appropriate wiring and connections are contained within inlet box 20, conduit 30 and junction box 32 for providing an electrical path between inlet box 20 and transfer panel 16 when cord 38 is engaged with the inlet receptacle of transfer panel 16.

A power cord 44 extends between generator 10 and power inlet box 20. Cord 44 includes a plug 46 at one end, which is engageable with the power outlet of generator 10. Cord 44 further includes a connector 48 at the end opposite plug 46. Connector 48 is engageable with receptacle 26 for transferring power generated by generator 10 to power inlet box 20, which is then supplied through the wiring in conduit 30, junction box 32, cord 38 and connector 42 to transfer panel 16, and from transfer panel 16 through the wiring in conduit 18 to main panel 12. In this manner, generator 10 functions to provide power to selected circuits of main panel 12 during a power outage. In this arrangement, it is necessary for the user to first connect cord 38 to the power input of transfer panel 16 utilizing connector 42, and to then exit the building, connect cord 44 between generator 10 and power inlet 20, and then commence operation of generator 10. This two-step procedure inevitably consumes a certain amount of time and inconvenience by first having to engage cord 38 with transfer panel 16 within building 14 and then exiting the building to carry out the various operations associated with connection and start-up of generator 10.

FIG. 2 illustrates a power transfer arrangement in accordance with the invention for use in place of transfer panel 16 of the prior art, to provide power from generator 10 to main electrical panel 12. The power transfer arrangement of FIG. 2 is adapted for positioning between power inlet box 20 and main electrical panel 12, which have the same function and construction as in the prior art power transfer arrangement of FIG. 1.

In the power transfer arrangement of FIG. 2, a power transfer device or switching mechanism 50 is interposed between load center 12 and inlet box 20. Power transfer switching mechanism 50 includes a cabinet or housing having the same general construction as illustrated in Flegel U.S. Pat. No. 5,895,981, the disclosure of which has previously been incorporated by reference. The cabinet includes a pair of side walls 52, 54, a top wall 56 extending between the upper ends of side walls 52 and 54, a bottom wall 58 (FIG. 3) extending between and interconnecting the lower ends of side walls 52 and 54, a partial height front panel 60 and a rear panel 62. Walls 52–58, in combination with front panel 60 and rear panel 62, define an upper cavity 64 behind front panel 60. A series of circuit breakers 66 and switches 68 are mounted to front panel 60, and are located within upper cavity 64. Circuit breakers 66 and switches 68 have the same general mounting, construction and operation as the circuit breakers and switches of power transfer panel 16 in the prior art, for controlling the supply of power from generator 10 to main panel 12.

Front panel 60 is bent rearwardly at its lower end to form an intermediate transverse wall 70 which defines the lower extent of upper cavity 64. A lower compartment 72 is defined by intermediate transverse wall 70 in combination with bottom wall 58, the lower portions of side walls 52 and 54, and the lower portion of rear panel 62. Compartment 72 is accessible through an opening below front panel 60. A cover 74 (FIG. 2) is selectively engageable with the housing of power transfer mechanism 50, and is sized so as to enclose the access opening of compartment 72. Cover 74 includes a pair of openings in alignment with openings formed in a pair of tabs 76 (FIG. 3) mounted to bottom wall 58. In this manner, cover 74 may be selectively mounted to bottom wall 58 utilizing threaded fasteners, such as shown at 78 in FIG. 2, which extend through the openings in cover 74 and into engagement with the openings in tabs 76. Cover 74 is selectively engaged with the housing of power transfer mechanism 50, so as to provide access to compartment 72 when removed and to enclose or prevent access to compartment 72 when mounted as shown in FIG. 2.

As shown in FIG. 3, a series of lead wires 80 extend into compartment 72. Each lead wire 80 defines an upper end extending into upper cavity 64, and a lower end located within compartment 72. The upper ends of two of lead wires 80 are typically connected to a pair of bus bars, and a set of switches 68 is mounted to each bus bar in a manner as is known. Alternatively, the two lead wires may be connected to a pair of power input meters which in turn are interconnected with bus bars and switches 68. Of the remaining two lead wires 80, one is a neutral wire connected in upper cavity 64 to a neutral wire extending through conduit 18 to main panel 12, and the other is a ground wire connected in upper cavity 64 to the frame of transfer switch 16 and to a ground wire extending through conduit 18 to main panel 12. Each lead wire 80 extends through a strain relief member 82, and each strain relief member 82 is mounted within an opening formed in transverse wall 70. In a manner as is known, each strain relief member 82 securely engages its respective lead wire 80, so as to fix the length of wire 80 between strain relief member 82 and the upper connection of wire 80. The length of wire 80 between its lower end and strain relief member 82 forms a "tail" which can-be freely moved about within compartment 72 or moved out of compartment 72, with strain relief member 82 functioning to prevent disengagement of the upper end of wire 80 from its upper connection upon such movement of the lower end of wire 80. With this arrangement, the lower ends of wires 80 extend into and are accessible from compartment 72.

As shown in FIGS. 2 and 3, a conduit 84 is mounted to side wall 52 of power transfer mechanism 50. Conduit 84 extends between power transfer mechanism 50 and power inlet box 20, and encloses a series of power input wires 86. Conduit 84 extends through a knock-out opening formed in the lower portion of side wall 52 via a conventional nipple 88 and lock nut 90. As can be appreciated, an input wire conduit such as 84 could also be connected through a knock-out opening in side wall 54, as shown in phantom in FIG. 3, or in a knock-out opening in bottom wall 58 or the lower portion of rear panel 62.

Power input wires 86 are connected at one end to power inlet receptacle 26 of inlet box 20. The opposite ends of power input wires 86, shown in FIG. 3, extend through the open end of conduit 84 and into compartment 72 of power transfer mechanism 50, where the power input wire ends are adapted for connection to the lower ends of lead wires 80. The end of each power input wire 86 is paired with an appropriate one of lead wires 80, and the paired wire ends are then exposed and connected in a conventional manner, such as by twisting together and securing the connection by use of conventional twist-on connectors 92, in a manner as is known.

This arrangement provides a direct, hard-wired, non-plug type connection between power inlet box 20 and power transfer mechanism 50, without the need for a plug-type connector. In addition, this arrangement eliminates the cost and space required by the terminal arrangement illustrated in U.S. Pat. No. 5,895,981, thus reducing the overall cost of manufacture of power transfer mechanism 50.

Power transfer mechanism 50 can be installed by an electrical contractor or a do-it-yourself homeowner, by first mounting power transfer mechanism 50 in a satisfactory location adjacent main panel 12. Cover 74 of power transfer mechanism 50 is then removed so as to expose lower compartment 72 and the ends of lead wires 80. Conduit 84 is then installed in a known manner, and the ends of power input wires 86 are then pulled through the passage of conduit 84 so as to extend into compartment 72. Lead wires 80 and power input wires 86 can then be cut to length as necessary, and the ends of lead wires 80 and power input wires 86 can be drawn out of compartment 72 to enable the installer to make the connections between lead wires 80 and power input wires 86. Once connected using connectors 92, lead wires 80, power input wires 86 and connectors 92 are then placed into compartment 72 and cover 74 is installed, so as to enclose compartment 72 and lead wires 80, power input wires 86 and connectors 92 contained therein. This enables establishment of a direct electrical connection between remote power inlet box 20 and power transfer mechanism 50, without the need for connecting a flexible cord to a power input receptacle as in the prior art. In this manner, the only step in operation of power transfer mechanism 50 to transfer power from generator 10 to main panel 12 is to place switches 68 in the appropriate position, so as to transfer power to main panel 12 as desired in response to operation of generator 10

In a known manner, output wires from switches 68 extend through compartment 72 and are connected to an elbow fitting 94 secured to bottom wall 58, for routing through conduit 18 to main panel 12.

Figure 3A:
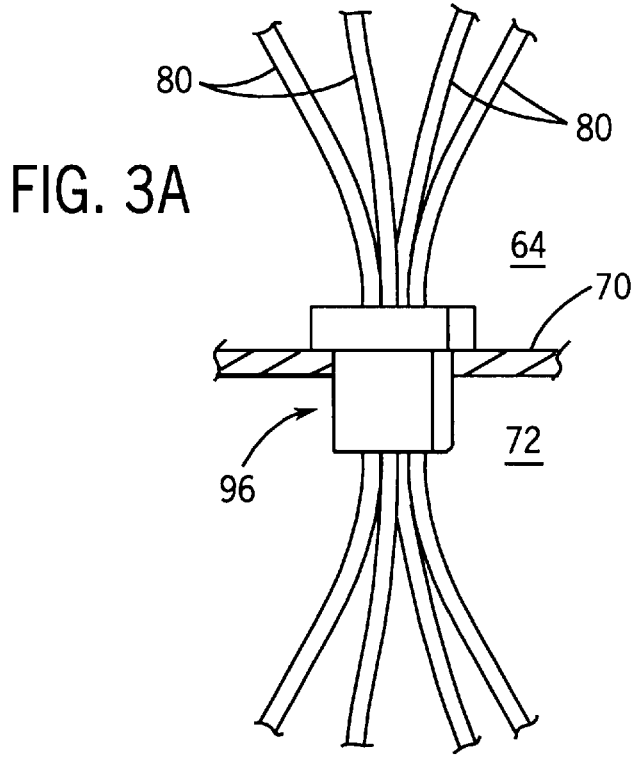
FIG. 3a is a partial front elevation view, with a portion in section, showing one version of a strain relief arrangement for use in the power transfer device of FIG. 3.

FIG. 3a illustrates an alternative arrangement for routing lead wires 80 10 from upper cavity 64 to lower compartment 72. In this arrangement, a single strain relief member 96 is mounted to transverse wall 70 in place of individual strain relief members 82. Strain relief member 96 incorporates a passage adapted to receive and engage four separate lead wires 80. This arrangement lowers overall component cost and labor in manufacture and assembly of power transfer mechanism 50.

Figure 3B:
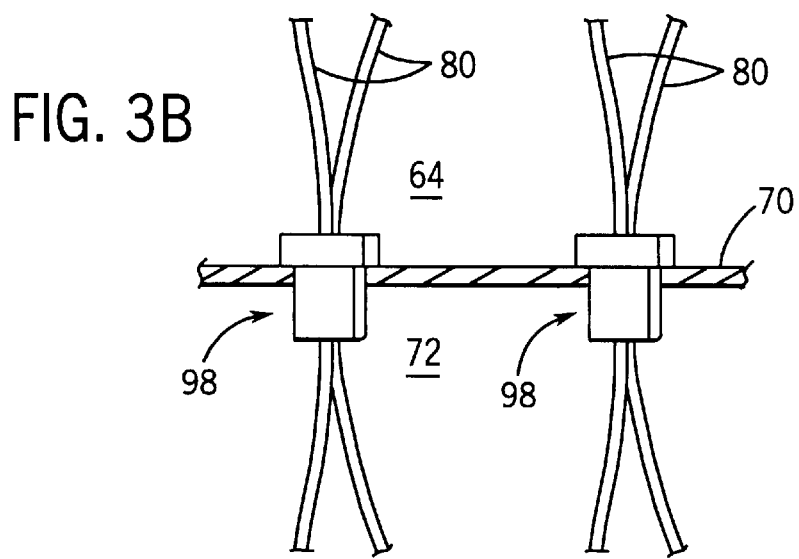
FIG. 3b is a view similar to FIG. 3a, showing an alternative strain relief arrangement for use in the power transfer device of FIG. 3.

FIG. 3b illustrates another alternative arrangement for routing lead wires 80 from upper cavity 64 into lower compartment 72. In this version, a pair of strain relief members 98 are mounted to transverse wall 70, and each strain relief member 98 is adapted to receive and engage two of lead wires 80. Again, this version lowers overall cost of components and assembly in manufacture of power transfer mechanism 50 in comparison to the version of FIGS. 2 and 3.

Figure 4:
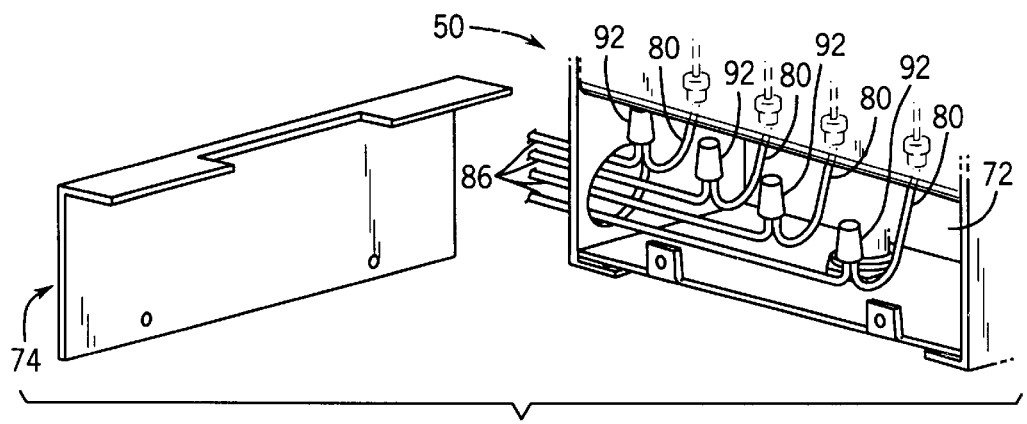
FIG. 4 is a partial exploded isometric view of the lower portion of the power transfer device of FIG. 2, illustrating the cover adapted for engagement with the power transfer device housing over the access opening.

FIG. 4 schematically illustrates the lower end of power transfer mechanism 50. As shown, cover 74 is removed, such that lower compartment 72 is exposed so as to enable power input wires 86 to be connected to lead wires 80 using connectors 92. As explained previously, once the connections between lead wires 80 and power. input wires 86 are made using connectors 92, input wires 86 are placed into compartment 72 along with lead wires 80 and connectors 92. Cover 74 is then secured over the outwardly facing access opening of lower compartment 72 and to prevent access to the connections between lead wires 80 and power input wires 86.

FIG. 4 illustrates conduit 84, nipple 88 and lock nut 90 removed, and input wires 86 extending through the opening formed by a knock-out section in side wall 52. It is understood, however, that power input wires 86 are normally housed within a conduit or other sheath when located externally of the housing of power transfer mechanism 50.

Figure 5:
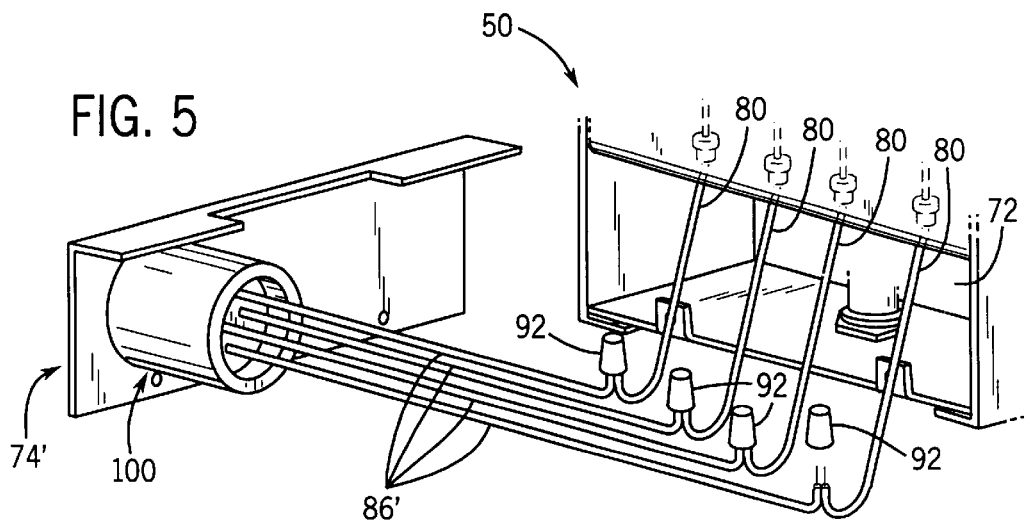
FIG. 5 is a view similar to FIG. 4, showing an alternative embodiment in which a power input receptacle is mounted to the cover and a set of power input or connection wires are interposed between the power input receptacle and the lead wires.

FIG. 5 illustrates an alternative embodiment, in which a power input socket or receptacle 100 is mounted to the front wall of cover 74'. Receptacle 100 may be constructed as shown and described in co-pending Application Ser. No. 09/062,257 filed Apr. 17, 1998, the disclosure of which is hereby incorporated by reference. In this version, power input wires 86' are mounted to terminals or other electrical connections associated with receptacle 100, extending rearwardly therefrom. The ends of power input wires 86' are connected to the ends of lead wires 80 in the same manner as described previously with respect to connection of power input wires 86 to lead wires 80. Once the connections between lead wires 80 and power input wires 86' are made using connectors 92, lead wires 80, power input wires 86' and connectors 92 are placed into lower compartment 72. Cover 74', to which receptacle 100 is mounted, is then secured to the housing of power transfer mechanism 50 in the same manner as described previously, to close lower compartment 72.

Figure 6:
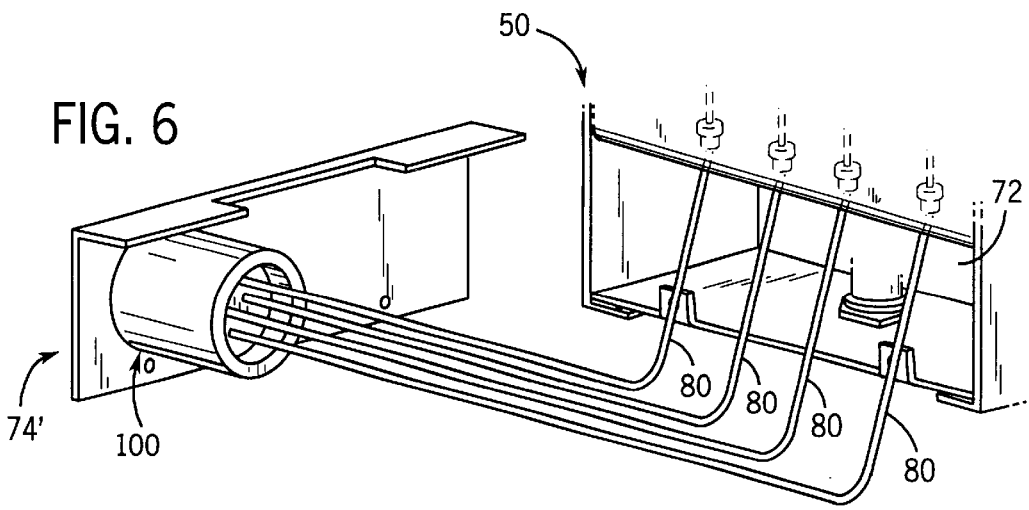
FIG. 6 is a view similar to FIG. 5, showing an alternative embodiment in which the lead wire ends are engaged directly with the power input receptacle.

FIG. 6 illustrates an alternative arrangement utilizing cover 74' and power input receptacle 100 mounted thereto. In this version, lead wires 80 have a longer length than that illustrated in FIGS. 1–5, which is sufficient to enable lead wires 80 to be manipulated so as to provide connection of the ends of lead wires 80 to the terminals or connectors associated with power input receptacle 100. Once the ends of lead wires 80 are engaged with power input receptacle 100, the length of lead wires 80 between strain relief members 82 and the connection to receptacle 100 is placed into lower compartment 72 and cover 74' is then mounted in the same manner as described previously to enclose and prevent assess to lower compartment 72.

FIGS. 4, 5 and 6 illustrate that the connection arrangement of the present invention may be used to directly connect power transfer mechanism 50 with power inlet box 20. Alternatively, the present invention may be used to connect a power input receptacle to power transfer mechanism 50, for use in a plug-type system as illustrated in FIG. 1.

Figure 7:
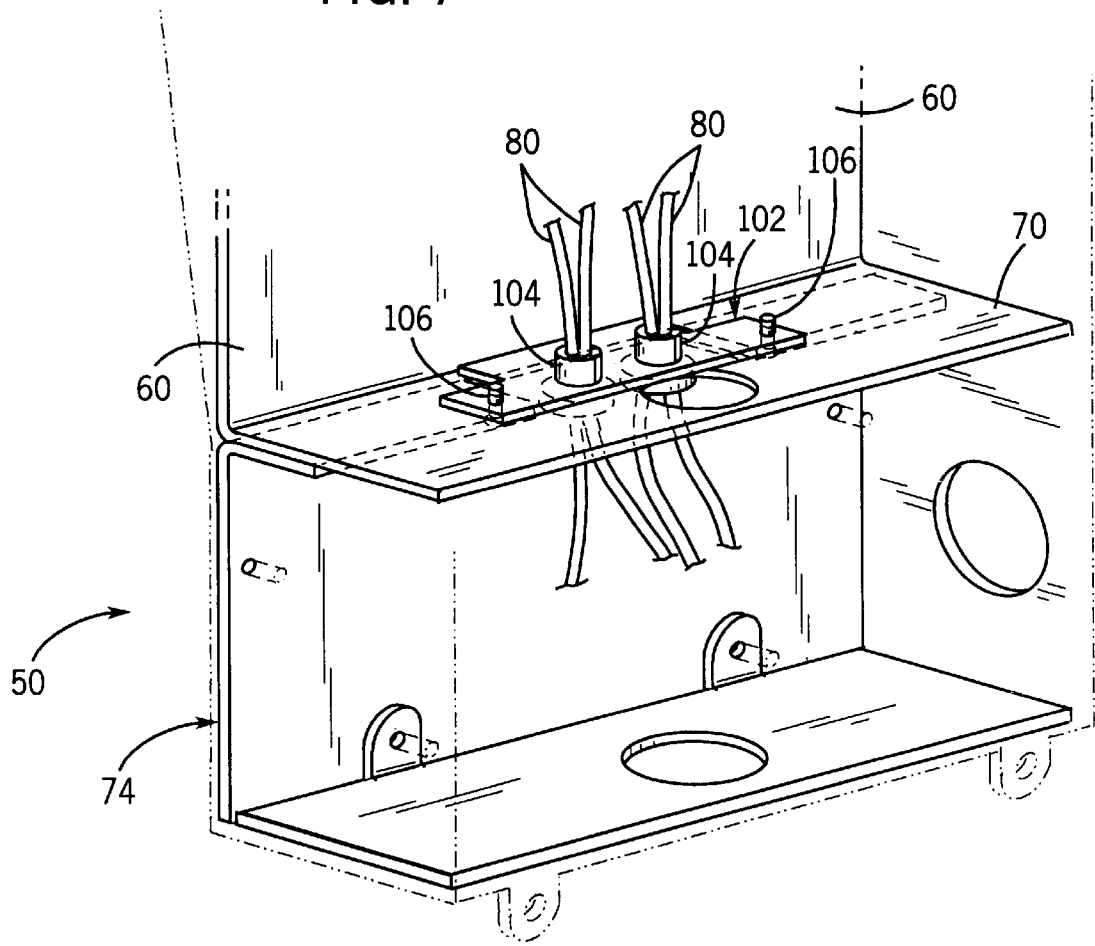
FIG. 7 is a partial isometric view illustrating the inner area of the housing of the power transfer device of FIG. 2, showing an alternative strain relief arrangement for the lead wires.

FIG. 7 illustrates in greater detail the internal components of power transfer mechanism 50, which is a surface mount unit adapted for mounting to the surface of a wall or the like. In this version, an opening is formed in transverse wall 70 which defines the upper extent of lower compartment 72. A mounting plate 102 is adapted for engagement with transverse wall 70 over the opening in transverse wall 70, and a pair of strain relief members 104 are mounted to mounting plate 102. Lead wires 80 extend through and are engaged with strain relief members 104, so as to fix the position of lead wires 80 relative to mounting plate 102. A pair of threaded openings are formed in mounting plate 102, and each threaded opening is adapted to engage a threaded fastener, such as a screw 106, which extends through an aligned opening in transverse wall 70. In this manner, strain relief members 104 are engaged with transverse wall 70 through mounting plate 102. Mounting plate 102 can be engaged with transverse wall 70 either before or after connection of the upper ends of lead wires 80. Again, cover 74 may be constructed as illustrated, or alternatively may include a power input receptacle such as 100 for connection to the ends of lead wires 80.

Figure 8:
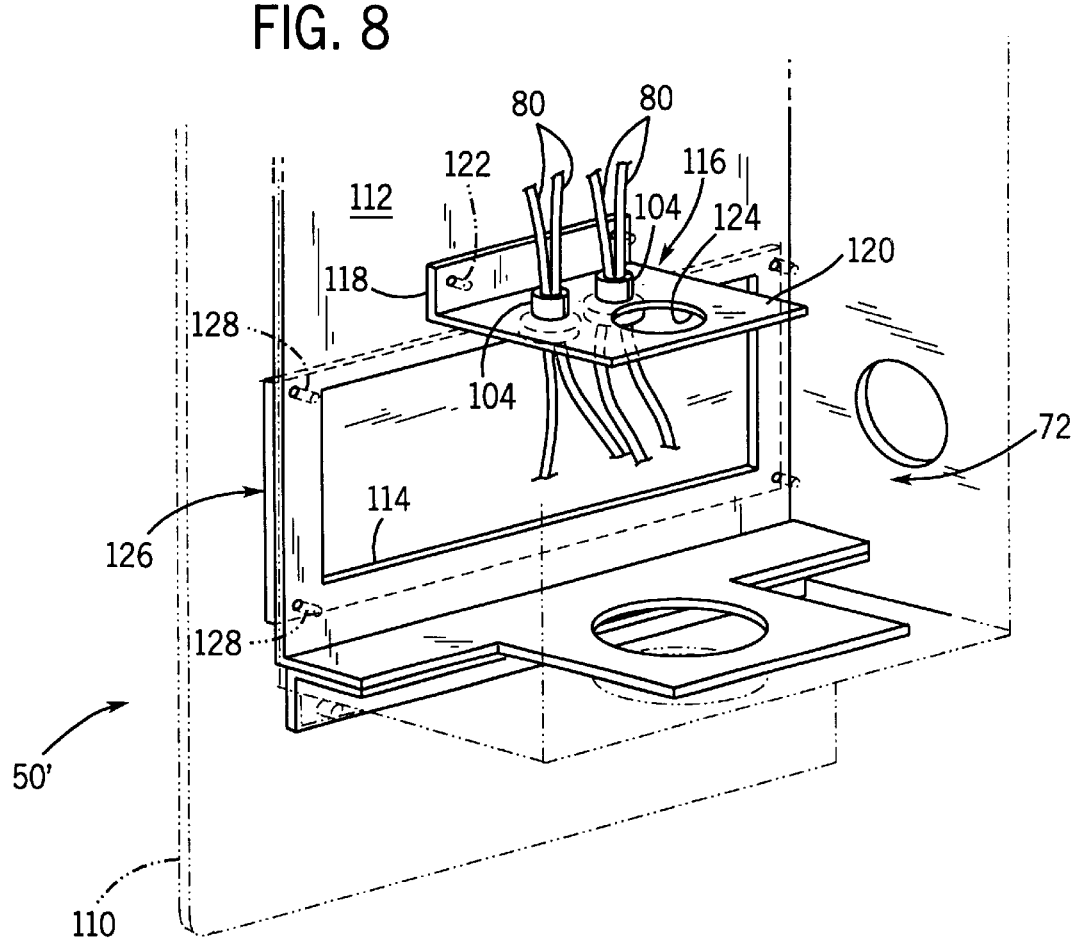
FIG. 8 is a view similar to FIG. 7, showing an alternative lead wire strain relief arrangement.

FIG. 8 illustrates the lower inside portion of a power transfer mechanism 50' in an isometric manner. Power transfer mechanism 50' has a flush-mount housing, including a frame plate 110 adapted to engage a wall within which an opening is formed for receiving the components of power transfer mechanism 50' rearwardly thereof. In this version, circuit breakers 66 and switches 68 are mounted to a front plate 112 located within an opening defined by frame plate 110. An opening 114 is formed in the lower end of front plate 112, and provides access to lower compartment 72.

In the embodiment of FIG. 8, a bracket 116 is mounted to the inside surface of front plate 112. Bracket 116 defines a front vertical wall 118 and a rearwardly extending horizontal wall 120. A pair of strain relief members 104 are mounted to horizontal wall 120. A pair of lead wires 80 extend through and are engaged with each strain relief member 104. Front vertical wall 118 of bracket 116 is adapted for mounting to front plate 112 of power transfer mechanism 50' by means of a pair of threaded fasteners 122, such as screws, which extend through front plate 112 and into threaded openings formed in front vertical wall 118.

With this arrangement, bracket 116 is secured to lead wires 80 between the ends of lead wires 80. Bracket 116, with lead wires 80 mounted thereto, can be mounted to front plate 112 either before or after the connection of the upper ends of lead wires 80. Bracket 116 thus provides a means separate from the housing of power transfer mechanism 50' for engaging the lead wires and mounting the lead wires to the housing, while providing strain relief for lead wires 80 to prevent the upper ends of lead wires 80 from being disengaged from their connections within upper cavity 64.

Rearwardly extending horizontal wall 120 of bracket 116 includes an opening 124, which is adapted to allow wires contained within conduit 18 to pass vertically therethrough.

In the version of FIG. 8, a flat, plate-like cover 126 is engageable with the outer surface of front plate 112 so as to enclose opening 114. Once lead wires 80 are engaged with power input wires 86 or 86', the lengths of lead wires 80 below horizontal wall 120 are placed into compartment 72, along with the lengths of power input wires 86' along with connectors 92. Cover 126 is then secured to front plate 112 using a series of threaded fasteners, such as screws 128, which extend through openings formed in cover 126 and into engagement with aligned, threaded openings formed in front plate 112. As can be appreciated, cover 126 may also have a power input receptacle such as 100 mounted thereto, and connections to the power input receptacle are made in the same manner as shown and described with respect to FIGS. 5 and 6.

It can thus be appreciated that the provision of compartment 72 provides an extremely convenient and simple arrangement for establishing a direct, hardwired connection between power inlet box 20 and a power transfer mechanism such as 50, 50'. The exposed ends of lead wires 80 located within compartment 72 can be quickly and easily manipulated for connection to a set of power input wires or to a power input receptacle, and the connected wires can then be placed within the compartment and enclosed using the cover. The user or installer simply removes the cover to gain access to compartment 72 for connecting or disengaging power input wires or a power input receptacle with the lead wires. Compartment 72 also provides a convenient cavity to facilitate pulling of wires through conduit 84. Once the user has completed the necessary operations in compartment 72, the user simply replaces the cover as described previously to thereafter prevent access to the compartment and the wire connections contained therein.

Various alternatives and embodiments are contemplated as being within the scope of the following claims particularly pointing out and distinctly claiming the subject matter regarded as the invention.

I claim:
1. In a power transfer device for supplying power from an auxiliary power source to an electrical system of a building, wherein the power transfer device includes a housing and a series of switches mounted to the housing and interconnected with the building electrical system, the improvement comprising:

an enclosed first section defined by the housing, wherein the switches are mounted to a wall defined by the housing that forms a part of the enclosed first section;

an open compartment defined by the housing, wherein the open compartment is separate from the enclosed first section and includes an internal cavity, wherein the housing is configured to define an opening in communication with the internal cavity for providing access to the internal cavity from the exterior of the housing;

one or more lead wires interconnected with and extending from the switches, wherein the lead wires define ends extending into the internal cavity;

wherein the power input comprises a remote power inlet box from which a set of power input wires extend, wherein the power input wires define ends that extend into the internal cavity of the housing, wherein the power input wire ends are connected to the lead wire ends for establishing an electrical connection between the remote power inlet box and the switches, wherein the connections of the power input wire ends and the lead wire ends are contained within the internal cavity; and a removable cover adapted for selective engagement with the housing, wherein the cover is configured to cover the opening defined by the housing to selectively enclose the internal cavity for preventing access to the ends of the lead wires and the power input wires.

2. The improvement of claim 1, wherein the power input wires extend through a conduit having an end fixed to the housing such that a passage defined by the conduit, through which the power input wires extend, is in communication with the internal cavity defined by the compartment.

3. In a power transfer device for supplying power from an auxiliary power source to an electrical system of a building, wherein the power transfer device includes a housing and a series of switches mounted to the housing and interconnected with the building electrical system, the improvement comprising:

an enclosed first section defined by the housing, wherein the switches are mounted to a wall defined by the housing that forms a part of the enclosed first section;

an open compartment defined by the housing, wherein the open compartment is separate from the enclosed first section and includes an internal cavity, wherein the housing is configured to define an opening in communication with the internal cavity for providing access to the internal cavity from the exterior of the housing;

one or more lead wires interconnected with and extending from the switches, wherein the lead wires define ends extending into the internal cavity;

a removable cover adapted for selective engagement with the housing, wherein the cover is configured to cover the opening defined by the housing to selectively enclose the internal cavity for preventing access to the ends of the lead wires; and wherein the power input comprises a power input receptacle mounted to and carried by the cover, wherein the ends of the lead wires are interconnected with the power input receptacle to connect the power input receptacle with the switches, and wherein the power input receptacle is adapted to receive a plug-type connector interconnected with the auxiliary power source.

4. The improvement of claim 3, wherein the power input receptacle is adapted to be received within the internal cavity of the compartment when the cover is engaged with the housing.

5. The improvement of claim 4, wherein the ends of the lead wires are directly engaged with the power input receptacle.

6. The improvement of claim 4, wherein a second set of wires is engaged with the power input receptacle, and wherein the second set of wires define ends adapted to be engaged with the ends of the lead wires by a series of connectors, and wherein the second set of wires and the series of connectors are adapted to be received within the compartment along with the power input receptacle.

7. In a power transfer device for supplying power from an auxiliary power source to an electrical system of a building, wherein the power transfer device includes a housing and a series of switches mounted to the housing and interconnected with the building electrical system, the improvement comprising:

an enclosed first section defined by the housing, wherein the switches are mounted to a wall defined by the housing that forms a part of the enclosed first section;

an open compartment defined by the housing, wherein the open compartment is separate from the enclosed first section and includes an internal cavity, wherein the housing is configured to define an opening in communication with the internal cavity for providing access through the internal cavity from the exterior of the housing;

one or more lead wires interconnected with and extending from the switches, wherein the lead wires define ends extending into the internal cavity, wherein the lead wires define ends that are adapted for engagement with a power input interconnected with the auxiliary power source, such that the lead wires establish an electrical path between the power input and the switches;

one or more strain relief members with which the one or more lead wires are engaged, wherein the one or more strain relief members are mounted to a stationary member associated with the housing and located adjacent the internal cavity defined by the compartment; and a removable cover adapted for selective engagement with the housing, wherein the cover is configured to cover the opening defined by the housing to selectively enclose the internal cavity for preventing access to the ends of the lead wires.

8. The improvement of claim 7, wherein the stationary member comprises a transverse wall defined by the housing, wherein the transverse wall at least in part defines the compartment.

9. The improvement of claim 8, wherein the one or more strain relief members are engaged with the transverse wall and extend through one or more openings formed in the transverse wall.

10. The improvement of claim 8, wherein the one or more strain relief members are mounted to a plate member separate from the transverse wall, wherein the plate member is adapted for mounting to the transverse wall for mounting the one or more strain relief members to the transverse wall.

11. The improvement of claim 10, wherein the one or more strain relief members are mounted to a bracket member separate from the housing and adapted for engagement with the housing at a location between the switches and the compartment.

12. The improvement of claim 11, wherein the housing defines a front wall within which an opening is formed and wherein the opening in the front wall comprises the access opening of the compartment, and wherein the bracket member is adapted to be mounted to the front wall adjacent the opening therein.

13. The improvement of claim 12, wherein the bracket member comprises a transverse section to which the one or more strain relief members are mounted, and a mounting section from which the transverse section extends, wherein the mounting section is engageable with the front wall of the housing for mounting the bracket member thereto.

14. A method of supplying power from an auxiliary power source to a power transfer device having a series of switches interconnected with an electrical system of a building for supplying power to the building electrical system from the auxiliary power source, comprising the steps of:

forming the power transfer device with a housing, wherein the housing includes an enclosed first section to which the switches are mounted, and an open compartment separate from the enclosed first section, wherein the compartment defines an internal cavity and wherein the housing is configured to form an opening in communication with the internal cavity for providing access to the internal cavity from the exterior of the housing;

interconnecting one or more lead wires with the switches, and arranging the one or more lead wires such that ends defined by the lead wires extend into the internal cavity of the compartment;

connecting the ends of the lead wires with a power input interconnected with the auxiliary power source for supplying auxiliary power to the power transfer device, wherein the step of connecting the ends of the lead wires with the power input is carried out by connecting the ends of the lead wires with ends defined by power input wires forming a part of the power input, wherein the power input wires extend from a power input area remote from the power transfer device, and wherein the interconnected ends of the power input wires and lead wires are positioned within the internal cavity of the compartment; and engaging a removable cover with the housing, wherein the cover is configured to cover the opening defined by the housing to selectively enclose the internal cavity so as to prevent access to the ends of the power input wires and the lead wires.

15. A method of supplying power from an auxiliary power source to a power transfer device having a series of switches interconnected with an electrical system of a building for supplying power to the building electrical system from the auxiliary power source, comprising the steps of:

forming the power transfer device with a housing, wherein the housing includes an enclosed first section to which the switches are mounted, and an open compartment separate from the enclosed first section, wherein the compartment defines an internal cavity and wherein the housing is configured to form an opening in communication with the internal cavity for providing access to the internal cavity from the exterior of the housing;

providing a removable cover adapted for selective engagement with the housing, wherein the cover is configured to cover the opening defined by the housing to selectively enclose the internal cavity, and wherein the cover includes a power input receptacle; and connecting the ends of the lead wires with the power input receptacle, wherein the power input receptacle is adapted to receive a plug-type connector interconnected with the auxiliary power source for supplying power to the power transfer device from the auxiliary power source through the power input receptacle and the lead wires;

wherein, when the cover is engaged with the housing, the interconnection of the lead wire ends with the power input receptacle is located within the internal cavity.

16. The method of claim 15, wherein the step of connecting the power input receptacle with the ends of the lead wires is carried out by directly engaging the ends of the lead wires with the power input receptacle.

17. The method of claim 15, wherein the step of connecting the power input receptacle with the ends of the lead wires is carried out by engaging a set of connector wires to the power input receptacle and engaging the connector wires with the ends of the lead wires.

18. The method of claim 16, further comprising the step of engaging the lead wires with a strain relief arrangement at a location between the switches and the cavity.

19. The method of claim 18, wherein the step of engaging the lead wires with the strain relief arrangement comprises securing one or more strain relief members to a mounting member, engaging the lead wires with the one or more strain relief members, and securing the mounting member to the housing.

20. The method of claim 17, further comprising the step of engaging the lead wires with a strain relief arrangement at a location between the switches and the internal cavity.

21. The method of claim 20, wherein the step of engaging the lead wires with the strain relief arrangement comprises securing one or more strain relief members to a mounting member, engaging the lead wires with the one or more strain relief members, and securing the mounting member to the housing.

* * * * *

UNITED STATES PATENT AND TRADEMARK OFFICE
CERTIFICATE OF CORRECTION

PATENT NO. : 6,414,240 B1
DATED : July 2, 2002
INVENTOR(S) : David D. Flegel

It is certified that error appears in the above-identified patent and that said Letters Patent is hereby corrected as shown below:

Column 10,
Line 58, delete "10" and substitute therefore -- 7 --.

Signed and Sealed this

Eighteenth Day of February, 2003

JAMES E. ROGAN
*Director of the United States Patent and Trademark Office*